United States Patent
Chen et al.

(10) Patent No.: US 11,308,671 B2
(45) Date of Patent: Apr. 19, 2022

(54) METHOD AND APPARATUS FOR CONTROLLING MOUTH SHAPE CHANGES OF THREE-DIMENSIONAL VIRTUAL PORTRAIT

(71) Applicant: Beijing Baidu Netcom Science and Technology Co., Ltd., Beijing (CN)

(72) Inventors: Chao Chen, Beijing (CN); Jianxiang Wang, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 16/721,772

(22) Filed: Dec. 19, 2019

(65) Prior Publication Data
US 2020/0410731 A1    Dec. 31, 2020

(30) Foreign Application Priority Data
Jun. 28, 2019    (CN) .......................... 201910573170.1

(51) Int. Cl.
*G06T 13/20* (2011.01)
*G06F 3/16* (2006.01)
(Continued)

(52) U.S. Cl.
CPC .............. *G06T 13/20* (2013.01); *G06F 3/167* (2013.01); *G10L 13/08* (2013.01); *G10L 15/22* (2013.01); *G10L 2015/223* (2013.01)

(58) Field of Classification Search
None
See application file for complete search history.

(56) References Cited

U.S. PATENT DOCUMENTS

2016/0349839 A1* 12/2016 Ohba ................ G02B 27/0172
2017/0148431 A1    5/2017 Catanzaro et al.
2017/0148433 A1    5/2017 Catanzaro et al.

FOREIGN PATENT DOCUMENTS

JP    2008-052628 A    3/2008
JP    2018-513399 A    5/2018
(Continued)

OTHER PUBLICATIONS

Kim, Taehwan, et al. "A decision tree framework for spatiotemporal sequence prediction." Proceedings of the 21th ACM SIGKDD International Conference on Knowledge Discovery and Data Mining. 2015.*

(Continued)

*Primary Examiner* — Yanna Wu
(74) *Attorney, Agent, or Firm* — Kilpatrick Townsend & Stockton LLP

(57) ABSTRACT

Embodiments of the present disclosure relate to a method and apparatus for controlling mouth shape changes of a three-dimensional virtual portrait, relating to the field of cloud computing. The method may include: acquiring a to-be-played speech; sliding a preset time window at a preset step length in the to-be-played speech to obtain at least one speech segment; generating, based on the at least one speech segment, a mouth shape control parameter sequence for the to-be-played speech; and controlling, in response to playing the to-be-played speech, a preset mouth shape of the three-dimensional virtual portrait to change based on the mouth shape control parameter sequence.

14 Claims, 6 Drawing Sheets

(51) Int. Cl.
   *G10L 13/08*   (2013.01)
   *G10L 15/22*   (2006.01)

(56) References Cited

FOREIGN PATENT DOCUMENTS

| KR | 10-0813034 B1 | 3/2008 |
| KR | 10-2018-0071029 A | 6/2018 |
| KR | 10-2019-0065408 A | 6/2019 |
| WO | 2019/084481 A1 | 5/2019 |

OTHER PUBLICATIONS

Taylor, Sarah, et al. "A deep learning approach for generalized speech animation." ACM Transactions on Graphics (TOG) 36.4 (2017): 1-11.*

* cited by examiner

METHOD AND APPARATUS FOR CONTROLLING MOUTH SHAPE CHANGES OF THREE-DIMENSIONAL VIRTUAL PORTRAIT

CROSS-REFERENCE TO RELATED APPLICATIONS

This application claims priority to Chinese Application No. 201910573170.1, filed on Jun. 28, 2019 and entitled "Method and Apparatus for Controlling Mouth Shape Changes of Three-Dimensional Virtual Portrait," the entire disclosure of which is hereby incorporated by reference.

TECHNICAL FIELD

Embodiments of the present disclosure relate to the field of computer technology, and specifically to a method and apparatus for controlling mouth shape changes of a three-dimensional virtual portrait.

BACKGROUND

Speech and mouth shape synchronization of three-dimensional virtual portraits has been a research hotspot and been widely applied. Common application fields include movie and television animation, game entertainment, etc. The conventional speech and mouth shape synchronization technology for a three-dimensional virtual portrait usually requires a professional technician to manually set key frames for the three-dimensional virtual portrait according to a given speech segment, and to adjust the mouth shape for the three-dimensional virtual portrait in the key frames. The mouth shape of the three-dimensional virtual portrait in transition frames between the key frames is automatically generated by an animation engine. For example, the mouth shape can be automatically generated by an animation engine such as UE4 (Unreal Engine), Maya, and Unity3D. This method relies heavily on the technical skill of the technician, frame-by-frame manual operation consumes a lot of manpower, and the method cannot be real-time.

SUMMARY

Embodiments of the present disclosure propose a method and apparatus for controlling mouth shape changes of a three-dimensional virtual portrait.

In a first aspect, an embodiment of the present disclosure provides a method for controlling mouth shape changes of a three-dimensional virtual portrait, the method including: acquiring a to-be-played speech; sliding a preset time window at a preset step length in the to-be-played speech to obtain at least one speech segment; generating, based on the at least one speech segment, a mouth shape control parameter sequence for the to-be-played speech; and controlling, in response to playing the to-be-played speech, a preset mouth shape of the three-dimensional virtual portrait to change based on the mouth shape control parameter sequence.

In some embodiments, the generating, based on the at least one speech segment, a mouth shape control parameter sequence for the to-be-played speech includes: generating, based on the at least one speech segment, a two-dimensional feature matrix sequence; and inputting the two-dimensional feature matrix sequence into a pre-established convolutional neural network to obtain the mouth shape control parameter sequence, wherein the convolutional neural network is used to characterize corresponding relationships between two-dimensional feature matrices and mouth shape control parameters.

In some embodiments, the generating, based on the at least one speech segment, a two-dimensional feature matrix sequence includes: generating, for a speech segment of the at least one speech segment, a two-dimensional feature matrix for the speech segment; and splicing, based on an order of the at least one speech segment in the to-be-played speech, generated at least one two-dimensional feature matrix into the two-dimensional feature matrix sequence.

In some embodiments, the generating, for a speech segment of the at least one speech segment, a two-dimensional feature matrix for the speech segment includes: dividing the speech segment into a preset number of speech sub-segments, wherein two adjacent speech sub-segments partially overlap; extracting, for a speech sub-segment in the preset number of speech sub-segments, a feature of the speech sub-segment to obtain a speech feature vector for the speech sub-segment; and generating, based on obtained preset number of speech feature vectors, the two-dimensional feature matrix for the speech segment.

In some embodiments, the generating, based on the at least one speech segment, a mouth shape control parameter sequence for the to-be-played speech includes: generating, for a speech segment of the at least one speech segment, a phoneme sequence of the speech segment, and encoding the phoneme sequence to obtain phoneme information; inputting a phoneme information sequence composed of at least one piece of phoneme information into a pre-established mouth shape key point predicting model to obtain a mouth shape key point information sequence composed of at least one piece of mouth shape key point information, wherein the mouth shape key point predicting model is used to characterize a corresponding relationship between the phoneme information sequence and the mouth shape key point information sequence; and generating, based on the mouth shape key point information sequence, the mouth shape control parameter sequence.

In some embodiments, the generating, based on the mouth shape key point information sequence, the mouth shape control parameter sequence includes: obtaining, for mouth shape key point information in the mouth shape key point information sequence, a mouth shape control parameter corresponding to the mouth shape key point information based on a pre-established corresponding relationship between sample mouth shape key point information and a sample mouth shape control parameter; and generating the mouth shape control parameter sequence based on obtained at least one mouth shape control parameter.

In some embodiments, the mouth shape key point predicting model is a recurrent neural network, and a loop body of the recurrent neural network is a long short-term memory.

In a second aspect, an embodiment of the present disclosure provides an apparatus for controlling mouth shape changes of a three-dimensional virtual portrait, the apparatus including: an acquiring unit, configured to acquire a to-be-played speech; a sliding unit, configured to slide a preset time window at a preset step length in the to-be-played speech to obtain at least one speech segment; a generating unit configured to generate, based on the at least one speech segment, a mouth shape control parameter sequence for the to-be-played speech; and a control unit configured to control, in response to playing the to-be-played speech, a preset mouth shape of the three-dimensional virtual portrait to change based on the mouth shape control parameter sequence.

In some embodiments, the generating unit includes: a first generating subunit configured to generate, based on the at least one speech segment, a two-dimensional feature matrix sequence; and a second generating subunit configured to input the two-dimensional feature matrix sequence into a pre-established convolutional neural network to obtain the mouth shape control parameter sequence, where the convolutional neural network is used to characterize corresponding relationships between two-dimensional feature matrices and mouth shape control parameters.

In some embodiments, the first generating subunit includes: a first generating module configured to generate, for a speech segment of the at least one speech segment, a two-dimensional feature matrix for the speech segment; and a second generating module configured to splice, based on an order of the at least one speech segment in the to-be-played speech, generated at least one two-dimensional feature matrix into the two-dimensional feature matrix sequence.

In some embodiments, the first generating module is further configured to: divide the speech segment into a preset number of speech sub-segments, where two adjacent speech sub-segments partially overlap; extract, for a speech sub-segment in the preset number of speech sub-segments, a feature of the speech sub-segment to obtain a speech feature vector for the speech sub-segment; and generate, based on obtained preset number of speech feature vectors, the two-dimensional feature matrix for the speech segment.

In some embodiments, the generating unit includes: an information generating unit configured to generate, for a speech segment of the at least one speech segment, a phoneme sequence of the speech segment, and encode the phoneme sequence to obtain phoneme information; an information sequence generating unit configured to input a phoneme information sequence composed of at least one piece of phoneme information into a pre-established mouth shape key point predicting model to obtain a mouth shape key point information sequence composed of at least one piece of mouth shape key point information, where the mouth shape key point predicting model is used to characterize a corresponding relationship between the phoneme information sequence and the mouth shape key point information sequence; and a parameter sequence generating unit configured to generate, based on the mouth shape key point information sequence, the mouth shape control parameter sequence.

In some embodiments, the parameter sequence generating unit is further configured to: obtain, for mouth shape key point information in the mouth shape key point information sequence, a mouth shape control parameter corresponding to the mouth shape key point information based on a pre-established corresponding relationship between sample mouth shape key point information and a sample mouth shape control parameter; and generate the mouth shape control parameter sequence based on the obtained at least one mouth shape control parameter.

In some embodiments, the mouth shape key point predicting model is a recurrent neural network, and a loop body of the recurrent neural network is a long short-term memory.

In a third aspect, an embodiment of the present disclosure provides a terminal device, the terminal device including: one or more processors; and a storage apparatus, storing one or more programs, where the one or more programs, when executed by the one or more processors, cause the one or more processors to implement any implementation of the method according to the first aspect.

In a fourth aspect, an embodiment of the present disclosure provides a computer readable medium, storing a computer program thereon, where the computer program, when executed by a processor, implements any implementation of the method according to the first aspect.

According to the method and apparatus for controlling mouth shape changes of a three-dimensional virtual portrait provided by embodiments of the present disclosure, at least one speech segment is first obtained by sliding a preset time window at a preset step length in the acquired to-be-played speech, then a mouth shape control parameter sequence for the to-be-played speech is generated based on the obtained at least one speech segment, and the preset mouth shape of the three-dimensional virtual portrait is controlled to change based on the mouth shape control parameter sequence when the to-be-played speech is played. The mouth shape control parameter sequence is automatically generated based on the to-be-played speech, thereby efficiently rendering the three-dimensional virtual portrait whose speech and mouth shape change synchronously.

BRIEF DESCRIPTION OF THE DRAWINGS

After reading detailed descriptions of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
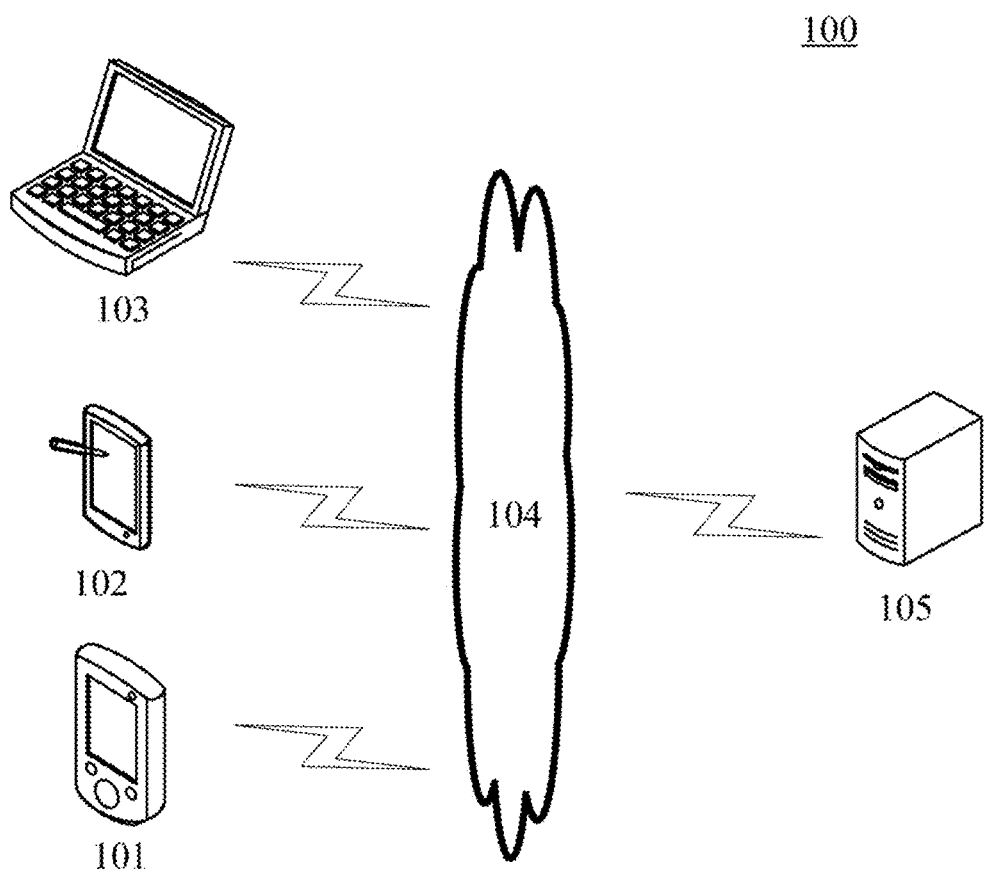
FIG. 1 is a diagram of an example system architecture in which embodiments of the present disclosure may be implemented.

FIG. 1 shows an example system architecture 100 in which a method for controlling mouth shape changes of a three-dimensional virtual portrait or an apparatus for controlling mouth shape changes of a three-dimensional virtual portrait according to embodiments of the present disclosure may be implemented.

As shown in FIG. 1, the system architecture 100 may include a terminal device 101, 102 or 103, a network 104, and a server 105. The network 104 serves as a medium providing a communication link between the terminal device 101, 102 or 103 and the server 105. The network 104 may include various types of connections, such as wired or wireless communication links, or optical fiber cables.

A user may interact with the server 105 using the terminal device 101, 102 or 103 through the network 104 to receive or send messages, etc. The terminal device 101, 102 or 103 may be installed with various communication client applications, such as web browser applications, game applications, shopping applications, search applications, or instant messaging tools.

The terminal device 101, 102 or 103 may be hardware or software. When the terminal device 101, 102 or 103 is hardware, the terminal device may be various electronic devices having a display screen and supporting speech play, including but not limited to a smart phone, a tablet computer, a laptop portable computer, a desktop computer, or the like. When the terminal device 101, 102 or 103 is software, the terminal device may be installed in the above-listed electronic devices. The terminal device may be implemented as a plurality of software programs or software modules (e.g., for providing distributed services), or as a single software program or software module. Specific limitations are not provided here.

The server 105 may be a server providing various services, for example, a backend server providing a support for speech played on the terminal device 101, 102 or 103. The backend server may analyze the received data such as text or speech, and feed the processing result (e.g., to-be-played speech) back to the terminal device 101, 102 or 103.

It should be noted that the server 105 may be hardware or software. When the server 105 is hardware, the server 105 may be implemented as a distributed server cluster composed of a plurality of servers, or as a single server. When the server 105 is software, the server 105 may be implemented as a plurality of software programs or software modules (e.g., for providing distributed services), or as a single software program or software module. Specific limitations are not provided here.

It should be understood that the numbers of the terminal devices, the network and the server in FIG. 1 are merely illustrative. Any number of terminal devices, networks and servers may be provided based on actual requirements.

It should be noted that the method for controlling mouth shape changes of a three-dimensional virtual portrait according to embodiments of the present disclosure is generally executed by the terminal device 101, 102 or 103. Accordingly, the apparatus for controlling mouth shape changes of a three-dimensional virtual portrait is generally provided in the terminal device 101, 102 or 103.

Figure 2:
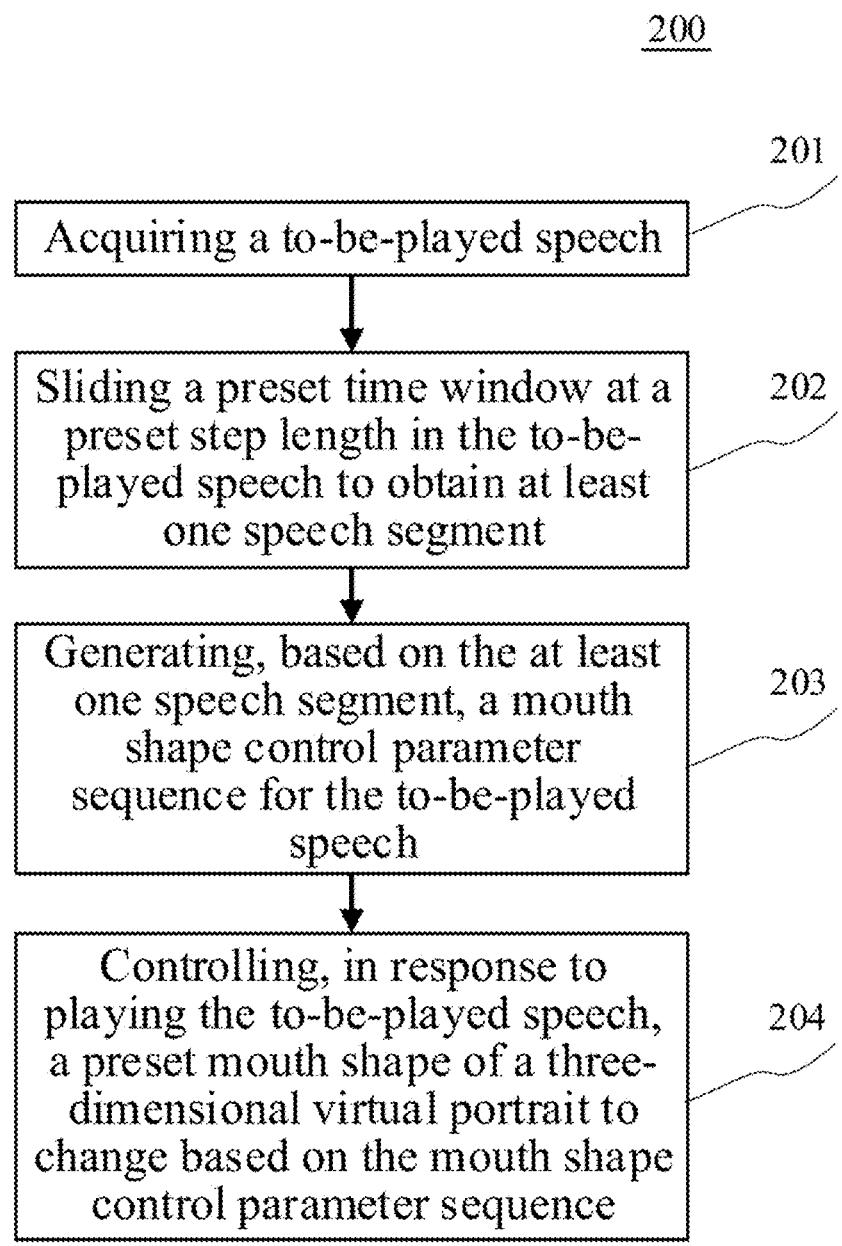
FIG. 2 is a flowchart of a method for controlling mouth shape changes of a three-dimensional virtual portrait according to an embodiment of the present disclosure.

Further, referring to FIG. 2, a flow 200 of a method for controlling mouth shape changes of a three-dimensional virtual portrait according to an embodiment of the present disclosure is shown. The method for controlling mouth shape changes of a three-dimensional virtual portrait includes the following steps.

Step 201: acquiring a to-be-played speech.

In the present embodiment, the executing body (for example, the terminal device 101, 102 or 103 shown in FIG. 1) of the method for controlling mouth shape changes of a three-dimensional virtual portrait may acquire the to-be-played speech in a variety of ways. As an example, the to-be-played speech may be a speech generated autonomously by the executing body. For example, the executing body may generate a response speech according to the information (e.g., text information, speech information, image information, etc.) inputted by a user and use the generated response speech as the to-be-played speech. As another example, the to-be-played speech may be acquired by the executing body from another device (e.g., the server 105 shown in FIG. 1).

Step 202: sliding a preset time window at a preset step length in the to-be-played speech to obtain at least one speech segment.

In the present embodiment, a time window may be preset in the executing body. Here, the time window may be a time period, and the time length of the time period may be set according to actual needs. As an example, the time window may be set to 520 ms (milliseconds). The executing body may slide the time window at the preset step length in the to-be-played speech acquired in step 201 to obtain at least one speech segment. In practice, the speech in the time window may be used as a speech segment after each slide. The step length may be set according to actual needs. As an example, the step length may be set to 10 ms.

Step 203: generating, based on the at least one speech segment, a mouth shape control parameter sequence for the to-be-played speech.

In the present embodiment, the executing body may generate, based on the at least one speech segment obtained in step 202, the mouth shape control parameter sequence for the to-be-played speech. Here, the mouth shape control parameter sequence may be used to control a preset mouth shape of a three-dimensional virtual portrait to change. In practice, a mouth shape control parameter may be generated for each speech segment, and a mouth shape control parameter sequence may be obtained accordingly. Taking the sliding step length of 10 ms of the time window as an example, a speech segment is determined every 10 ms, and a mouth shape control parameter is obtained for each speech segment. Accordingly, a mouth shape control parameter can be generated every 10 ms, that is, the interval of each mouth shape control parameter is 10 ms in the mouth shape control parameter sequence for the to-be-played speech.

Figure 3A:
FIG. 3a and FIG. 3b respectively show the opening degrees of a jaw of a three-dimensional virtual portrait corresponding to jaw_open=0 and jaw_open=1.
Figure 3B:
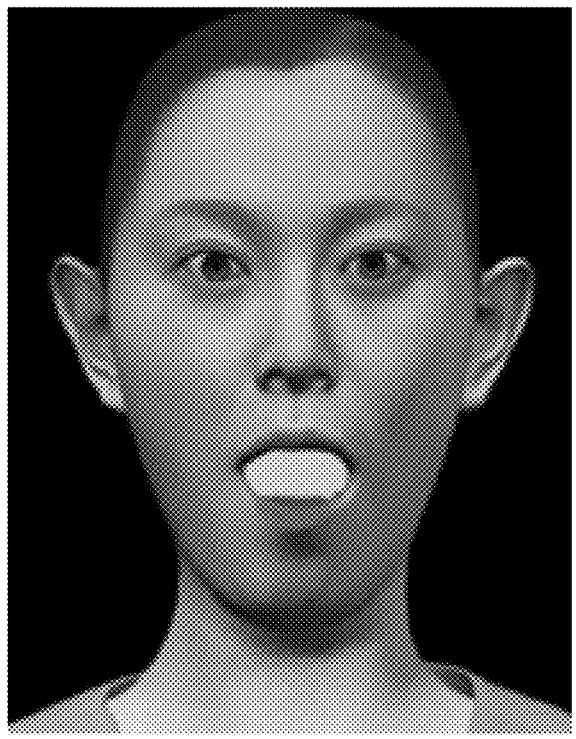

The mouth shape control parameter may be a parameter of a mouth shape change of the three-dimensional virtual portrait developed by a three-dimensional virtual portrait development tool. In practice, the existing animation engines such as UE4, Maya, and Unity3D may be used as development tools for developing three-dimensional virtual portraits. The face (or mouth shape) drive of the three-dimensional virtual portrait may be controlled by some predefined parameters, the parameter may be a vector, and each dimension of the vector may be within a range of [0, 1], representing a particular face motion. For example, the vector may include a jaw_open dimension for controlling the opening degree of a jaw of the three-dimensional virtual portrait, and a larger value indicates larger opening. FIG. 3a and FIG. 3b respectively show the opening degrees of a jaw of a three-dimensional virtual portrait corresponding to jaw_open=0 and jaw_open=1. It should be noted that the three-dimensional virtual portrait in FIG. 3a and FIG. 3b is merely illustrative, rather than limiting the gender, appearance or the like of the three-dimensional virtual portrait.

In some optional implementations of the present embodiment, step 203 may specifically include the following contents.

Step S1: generating, for a speech segment of the at least one speech segment, a phoneme sequence of the speech segment, and encoding the phoneme sequence to obtain phoneme information.

In this implementation, for each of the at least one speech segment obtained in step 202, the executing body may generate a phoneme sequence of the speech segment. Here, the phoneme sequence may indicate a plurality of phonemes arranged on a time axis. Phonemes are the smallest unit of speech, and each phoneme corresponds to a specific pronunciation. The phoneme sequence of the speech segment may be generated by the existing acoustic model. Thereafter, the executing body may encode the obtained phoneme sequence to obtain phoneme information. In this way, the executing body can generate a piece of phoneme information according to each speech segment. The encoding may refer to converting the phoneme sequence into digital phoneme information for further processing.

Step S2: inputting a phoneme information sequence composed of at least one piece of phoneme information into a pre-established mouth shape key point predicting model to obtain a mouth shape key point information sequence composed of at least one piece of mouth shape key point information.

In this implementation, the executing body may first constitute a phoneme information sequence using at least one piece of phoneme information obtained in step S1. As an example, for each of the at least one piece of phoneme information, the executing body may determine, based on the position of the speech segment for generating the phoneme information in the to-be-played speech, the position of the phoneme information in the phoneme information sequence. Thereafter, the executing body may input the phoneme information sequence into the pre-established mouth shape key point predicting model to obtain a mouth shape key point information sequence composed of at least one piece of mouth shape key point information. The mouth shape key point information may be used to indicate position information of a preset number (for example, 20) of face key points related to the mouth shape. The mouth shape key point predicting model may be used to characterize the corresponding relationship between the phoneme information sequence and the mouth shape key point information sequence. As an example, the mouth shape key point predicting model may be a corresponding relationship table, which is created in advance by a technician based on the statistics of a large number of phoneme information sequences and mouth shape key point information sequences, and stores a plurality of corresponding relationships between phoneme information sequences and mouth shape key point information sequences. As another example, the executing body may be a machine learning model trained based on a machine learning algorithm.

In some optional implementations, the mouth shape key point predicting model in step S2 may be a recurrent neural network, and the loop body of the recurrent neural network may be a long short-term memory.

Figure 4:
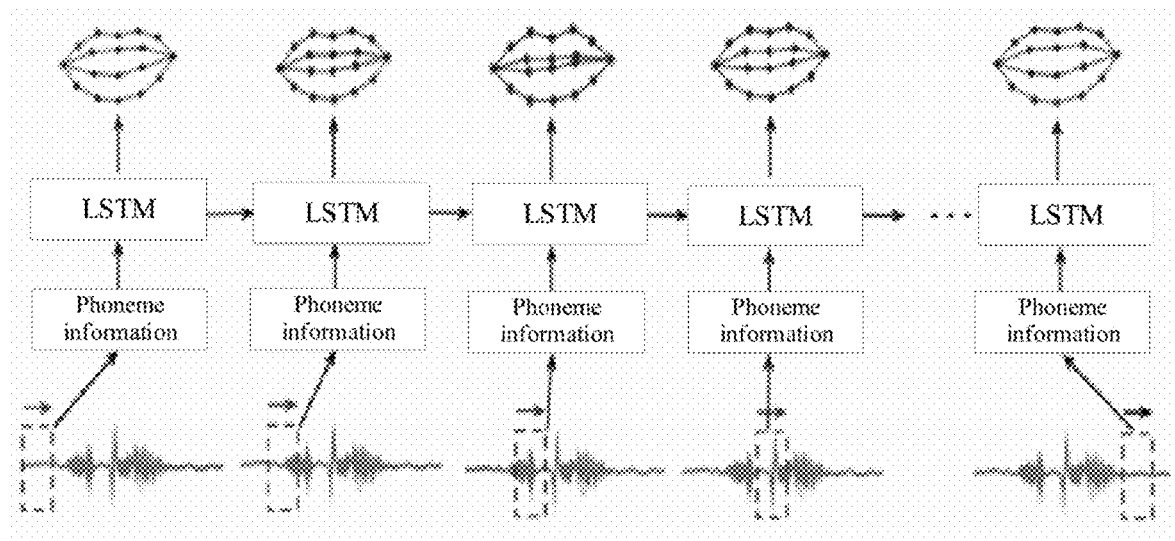
FIG. 4 is a schematic diagram from a to-be-played speech to a mouth shape key point information sequence according to an embodiment of the present disclosure.

In this implementation, the mouth shape key point predicting model in step S2 may be a recurrent neural network. The Recurrent Neural Network (RNN) uses sequence data as input, and is recursive in the evolution direction of a sequence, and all nodes (loop bodies) of the RNN are chained. The loop body of the RNN may be a Long Short-Term Memory (LSTM). As an example, FIG. 4 illustratively shows a schematic diagram from a to-be-played speech to a mouth shape key point information sequence, where an RNN with the loop body being LSTM is used. The dashed box in FIG. 4 is used to represent a time window, and the arrow above the dashed box is used to indicate a sliding direction of the time window. It can be seen from the information shown in FIG. 4 that, when predicting mouth shape key point information corresponding to a piece of phoneme information in the phoneme information sequence, the mouth shape key point information obtained based on the previous piece of phoneme information is used. In this implementation, when generating a mouth shape key point information sequence, the correlation between two consecutive pieces of mouth shape key point information is comprehensively considered, so that the generated mouth shape key point information sequence is more accurate. It should be noted that the structure of the RNN described in FIG. 4 is merely illustrative, rather than limiting the structure of the RNN.

Step S3: generating, based on the mouth shape key point information sequence, a mouth shape control parameter sequence.

In this implementation, the executing body may generate the mouth shape control parameter sequence based on the mouth shape key point information sequence. In practice, a piece of specific mouth shape key point information may correspond to a specific mouth shape, and a specific mouth shape corresponds to a specific mouth shape control parameter, that is, the mouth shape key point information and the mouth shape control parameter are strongly correlated. Accordingly, the executing body can determine a mouth shape control parameter based on a piece of mouth shape key point information.

In some optional implementations, step 203 may specifically include the following contents.

First, for mouth shape key point information in the mouth shape key point information sequence, a mouth shape control parameter corresponding to the mouth shape key point information is obtained based on the pre-established corresponding relationship between sample mouth shape key point information and a sample mouth shape control parameter.

In this implementation, corresponding relationships between sample mouth shape key point information and sample mouth shape control parameters, that is, a plurality of relationships (between sample mouth shape key point information and sample mouth shape control parameters) may be pre-stored in the executing body. In this way, for each piece of mouth shape key point information in the mouth shape key point information sequence, the executing body can calculate the similarity between the mouth shape key point information and the sample mouth shape key point information in the plurality of relationships, and the sample mouth shape control parameter corresponding to the sample mouth shape key point information having the highest similarity to the mouth shape key point information is used as the mouth shape control parameter corresponding to the mouth shape key point information.

Then, a mouth shape control parameter sequence is generated based on the obtained at least one mouth shape control parameter.

In this implementation, for each piece of mouth shape key point information in the mouth shape key point information sequence, the executing body may obtain a mouth shape control parameter. In this way, the executing body can obtain at least one mouth shape control parameter. The executing body can generate a mouth shape control parameter sequence using the obtained at least one mouth shape control parameter.

Step 204: controlling, in response to playing the to-be-played speech, a preset mouth shape of a three-dimensional virtual portrait to change based on the mouth shape control parameter sequence.

In the present embodiment, the executing body may synchronously control the mouth shape of the three-dimensional virtual portrait to change based on the mouth shape control parameter sequence generated in step 203 while playing the to-be-played speech. In this way, the executing body can present the user with a three-dimensional virtual portrait whose speech and mouth shape change synchronously, thereby improving the authenticity of the three-dimensional virtual portrait and improving the user experience.

Figure 5:
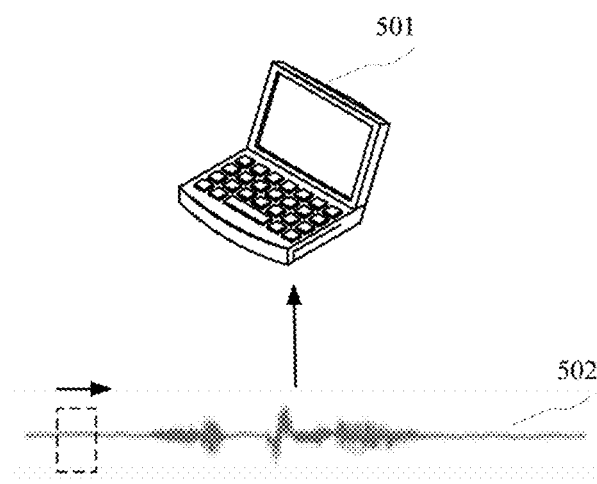
FIG. 5 is a schematic diagram of an application scenario of the method for controlling mouth shape changes of a three-dimensional virtual portrait according to an embodiment of the present disclosure.

Further referring to FIG. 5, FIG. 5 is a schematic diagram of an application scenario of the method for controlling mouth shape changes of a three-dimensional virtual portrait according to an embodiment of the present embodiment. In the application scenario of FIG. 5, a terminal device 501 first acquires a to-be-played speech 502. Thereafter, the terminal device 501 slides a time window of 520 ms (as indicated by the dashed box) at a step length of 10 ms in the to-be-played speech 502 to obtain at least one speech segment. Then, the terminal device 501 generates, based on the at least one speech segment, a mouth shape control parameter sequence for the to-be-played speech 502. Finally, the terminal device 501 controls, in response to playing the to-be-played speech 502, a preset mouth shape of a three-dimensional virtual portrait to change based on the mouth shape control parameter sequence, thus presenting the user with a three-dimensional virtual portrait whose speech and mouth shape change synchronously.

The method according to some embodiments of the present disclosure can automatically generate a mouth shape control parameter sequence based on a to-be-played speech, thereby efficiently rendering a three-dimensional virtual portrait whose speech and mouth shape change synchronously.

Figure 6:
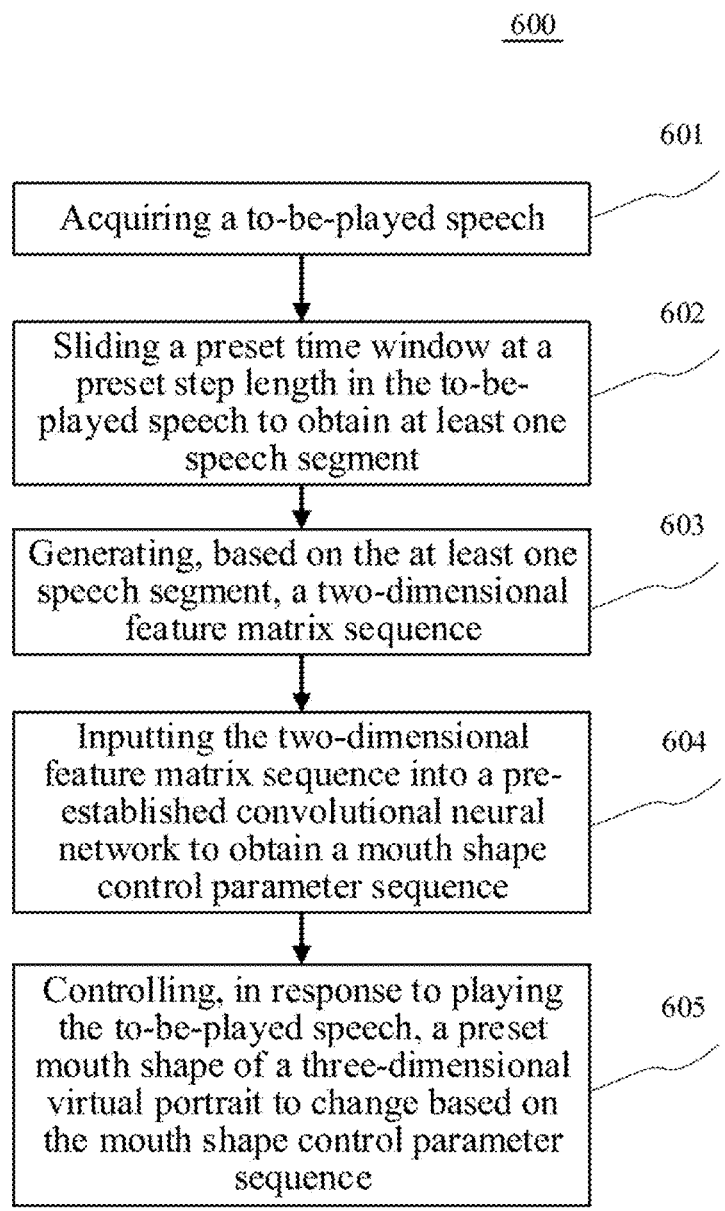
FIG. 6 is a flowchart of the method for controlling mouth shape changes of a three-dimensional virtual portrait according to another embodiment of the present disclosure.

Further referring to FIG. 6, a flow 600 of another embodiment of the method for controlling mouth shape changes of a three-dimensional virtual portrait is shown. The flow 600 of the method for controlling mouth shape changes of a three-dimensional virtual portrait includes the following steps.

Step 601: acquiring a to-be-played speech.

In the present embodiment, step 601 is similar to step 201 of the present embodiment shown in FIG. 2, and details are not described herein again.

Step 602: sliding a preset time window at a preset step length in the to-be-played speech to obtain at least one speech segment.

In the present embodiment, step 602 is similar to step 202 of the present embodiment shown in FIG. 2, and details are not described herein again.

Step 603: generating, based on the at least one speech segment, a two-dimensional feature matrix sequence.

In the present embodiment, the executing body may generate, based on the at least one speech segment obtained in step 602, the two-dimensional feature matrix sequence in a variety of ways. For example, feature extraction is performed on the speech segment, and a two-dimensional feature matrix sequence is generated according to the feature extraction result.

In some optional implementations of the present embodiment, step 603 may specifically include the following steps.

Step 1: generating, for a speech segment of the at least one speech segment, a two-dimensional feature matrix for the speech segment.

In this implementation, for each of the at least one speech segment, the executing body may generate the two-dimensional feature matrix for the speech segment. The executing body may extract features from the speech segment in various ways to generate a two-dimensional feature matrix.

In some optional implementations, step 1 may be implemented as follows.

First, the speech segment is divided into a preset number of speech sub-segments.

In this implementation, the executing body may divide the speech segment into a preset number of speech sub-segments, where two adjacent speech sub-segments partially overlap. Taking the speech segment of 520 ms as an example, the executing body may divide the speech segment into 64 speech sub-segments, where each of the speech sub-segments is 16 ms, and two adjacent speech sub-segments overlap 8 ms. The two adjacent speech sub-segments partially overlap to ensure that sufficient features can be extracted subsequently.

Then, for a speech sub-segment of the preset number of speech sub-segments, a feature of the speech sub-segment is extracted to obtain a speech feature vector for the speech sub-segment.

In this implementation, for each of the preset number of speech sub-segments, the executing body may extract the feature of the speech sub-segment to obtain a speech feature vector for the speech sub-segment. As an example, for each speech sub-segment, the executing body may extract first preset number of (for example, first 32) components of LPC (Linear Predictive Coding) and use the first preset number of components as a speech feature vector. Accordingly, based on the preset number of speech sub-segments, the executing body can obtain a preset number of speech feature vectors.

Finally, a two-dimensional feature matrix for the speech segment is generated according to the obtained preset number of speech feature vectors.

In this implementation, based on the obtained preset number of speech feature vectors, the executing body can generate the two-dimensional feature matrix for the speech segment. As an example, the executing body may sort, based on an order of the speech sub-segments in the speech segment, the speech feature vectors generated based on the semantic sub-segments from top to bottom to obtain a two-dimensional feature matrix for the speech segment.

Step 2: splicing, based on an order of the at least one speech segment in the to-be-played speech, the generated at least one two-dimensional feature matrix into a two-dimensional feature matrix sequence.

In this implementation, based on the order of each of the at least one speech segment in the to-be-played speech, the at least one two-dimensional feature matrix generated according to the at least one speech segment is spliced into a two-dimensional feature matrix sequence.

Step 604: inputting the two-dimensional feature matrix sequence into a pre-established convolutional neural network to obtain a mouth shape control parameter sequence.

In the present embodiment, a convolutional neural network may be pre-established in the executing body, and the convolutional neural network may be used to characterize corresponding relationships between two-dimensional feature matrices and mouth shape control parameters. Thus, the executing body can input the two-dimensional feature matrix sequence generated in step 603 into the convolutional neural network. The convolutional neural network can sequentially process the two-dimensional feature matrices in the two-dimensional feature matrix sequence to obtain a mouth shape control parameter sequence.

The structure of the convolutional neural network may be set according to actual needs. As an example, the convolutional neural network may include an input layer, convolutional layers, fully connected layers, an output layer, and the like. For example, the convolutional neural network may include an input layer, a preset number (e.g., 10) of convolutional layers, a preset number (e.g., 2) of fully connected layers, and an output layer. In practice, the convolutional neural network may be trained using a large amount of sample data. The sample data may include a sample two-dimensional feature matrix and a sample mouth shape control parameter corresponding to the sample two-dimensional feature matrix. During training, the convolutional neural network may be trained using the sample two-dimensional feature matrix as an input, and the sample mouth shape control parameter corresponding to the input sample two-dimensional feature matrix as a desired output.

Step 605: controlling, in response to playing the to-be-played speech, a preset mouth shape of a three-dimensional virtual portrait to change based on the mouth shape control parameter sequence.

In the present embodiment, step 605 is similar to step 204 of the present embodiment shown in FIG. 2, and details are not described herein again.

It can be seen from FIG. 6 that, compared with the corresponding embodiment of FIG. 2, the flow 600 for controlling mouth shape changes of a three-dimensional virtual portrait in the present embodiment highlights the step of generating a mouth shape control parameter sequence based on a convolutional neural network. The convolutional neural network is trained based on a large amount of sample data, so that the generated mouth shape control parameter sequence is more accurate. With the solution described in the present embodiment, the mouth shape changes of the three-dimensional virtual portrait whose speech and mouth shape change synchronously are more vivid.

Figure 7:
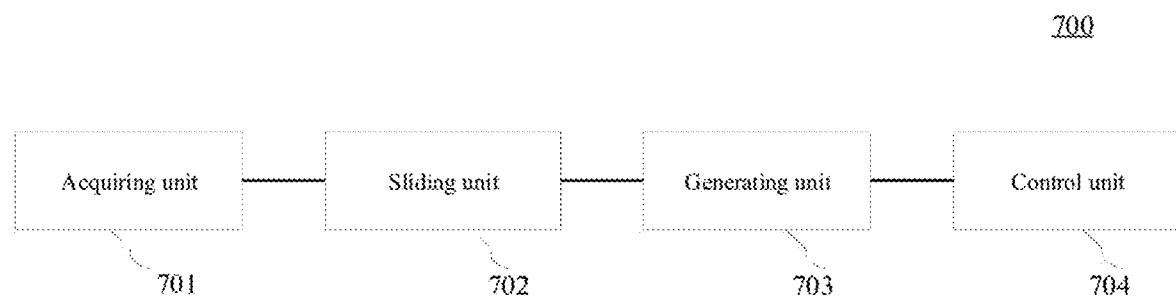
FIG. 7 is a schematic structural diagram of an apparatus for controlling mouth shape changes of a three-dimensional virtual portrait according to an embodiment of the present disclosure.

Further referring to FIG. 7, as an implementation of the method shown in the above figures, an embodiment of the present disclosure provides an apparatus for controlling mouth shape changes of a three-dimensional virtual portrait. An embodiment of the apparatus may correspond to an embodiment of the method shown in FIG. 2, and the apparatus may be applied to various electronic devices.

As shown in FIG. 7, the apparatus 700 for controlling mouth shape changes of a three-dimensional virtual portrait in the present embodiment includes: an acquiring unit 701, a sliding unit 702, a generating unit 703, and a control unit 704. The acquiring unit 701 is configured to acquire a to-be-played speech; the sliding unit 702 is configured to slide a preset time window at a preset step length in the to-be-played speech to obtain at least one speech segment; the generating unit 703 is configured to generate, based on the at least one speech segment, a mouth shape control parameter sequence for the to-be-played speech; the control unit 704 is configured to control, in response to playing the to-be-played speech, a preset mouth shape of the three-dimensional virtual portrait to change based on the mouth shape control parameter sequence.

In the present embodiment, the specific processing of the acquiring unit 701, the sliding unit 702, the generating unit 703, and the control unit 704 of the apparatus 700 for controlling mouth shape changes of a three-dimensional virtual portrait and the technical effects thereof may be referred to the related description in step 201, step 202, step 203 and step 204 in the corresponding embodiment of FIG. 2, respectively. The description will not be repeated here.

In some optional implementations of the present embodiment, the generating unit 703 includes: a first generating subunit (not shown) configured to generate, based on the at least one speech segment, a two-dimensional feature matrix sequence; and a second generating subunit (not shown) configured to input the two-dimensional feature matrix sequence into a pre-established convolutional neural network to obtain the mouth shape control parameter sequence, where the convolutional neural network is used to characterize corresponding relationships between two-dimensional feature matrices and mouth shape control parameters.

In some optional implementations of the present embodiment, the first generating subunit includes: a first generating module (not shown) configured to generate, for a speech segment of the at least one speech segment, a two-dimensional feature matrix for the speech segment; and a second generating module (not shown) configured to splice, based on an order of the at least one speech segment in the to-be-played speech, generated at least one two-dimensional feature matrix into the two-dimensional feature matrix sequence.

In some optional implementations of the present embodiment, the first generating module is further configured to: divide the speech segment into a preset number of speech sub-segments, where two adjacent speech sub-segments partially overlap; extract, for a speech sub-segment in the preset number of speech sub-segments, a feature of the speech sub-segment to obtain a speech feature vector for the speech sub-segment; and generate, based on obtained preset number of speech feature vectors, the two-dimensional feature matrix for the speech segment.

In some optional implementations of the present embodiment, the generating unit 703 includes: an information generating unit (not shown) configured to generate, for a speech segment of the at least one speech segment, a phoneme sequence of the speech segment, and encode the phoneme sequence to obtain phoneme information; an information sequence generating unit (not shown) configured to input a phoneme information sequence composed of at least one piece of phoneme information into a pre-established mouth shape key point predicting model to obtain a mouth shape key point information sequence composed of at least one piece of mouth shape key point information, where the mouth shape key point predicting model is used to characterize a corresponding relationship between the phoneme information sequence and the mouth shape key point information sequence; and a parameter sequence generating unit (not shown) configured to generate, based on the mouth shape key point information sequence, the mouth shape control parameter sequence.

In some optional implementations of the present embodiment, the parameter sequence generating unit is further configured to: obtain, for mouth shape key point information in the mouth shape key point information sequence, a mouth shape control parameter corresponding to the mouth shape key point information based on a pre-established corresponding relationship between sample mouth shape key point information and a sample mouth shape control parameter; and generate the mouth shape control parameter sequence based on the obtained at least one mouth shape control parameter.

In some optional implementations of the present embodiment, the mouth shape key point predicting model is a recurrent neural network, and a loop body of the recurrent neural network is a long short-term memory.

Figure 8:
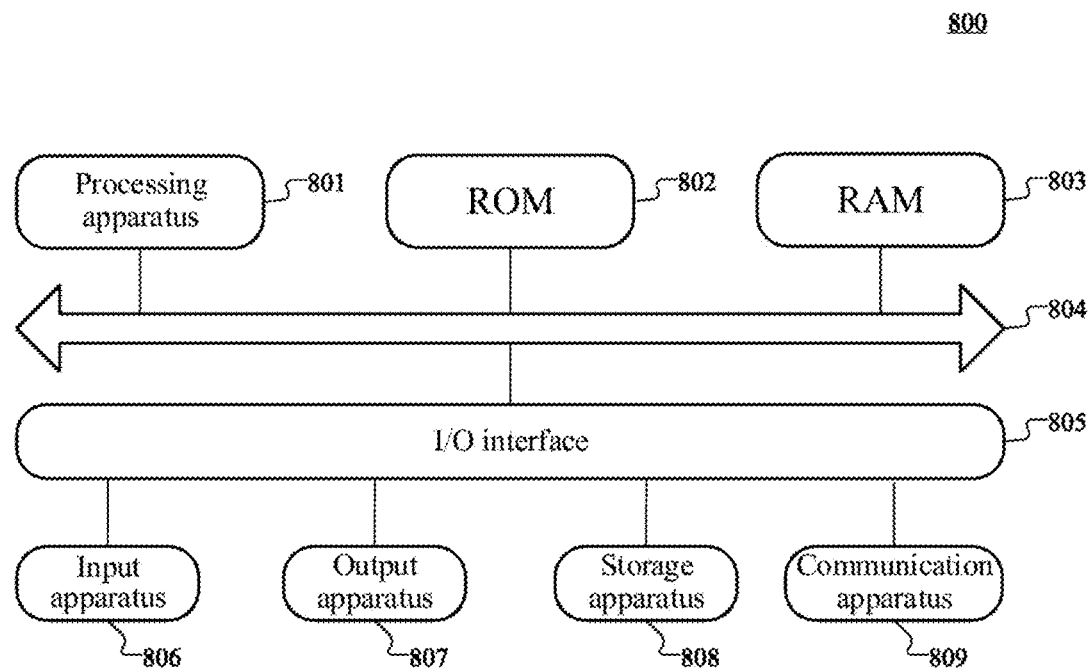
FIG. 8 is a schematic structural diagram of a computer system adapted to implement a device of embodiments of the present disclosure.

Referring to FIG. 8 below, a schematic structural diagram of an electronic device (e.g., the terminal device in FIG. 1) 800 adapted to implement some embodiments of the present disclosure is shown. The terminal device in some embodiments of the present disclosure may include, but not limited to, a mobile terminal such as a mobile phone, a notebook computer, a digital broadcast receiver, a PDA (Personal Digital Assistant), a PAD (Tablet), a PMP (Portable Multimedia Player) and an onboard terminal (for example, an onboard navigation terminal), and a fixed terminal such as a digital TV and a desktop computer. The terminal device shown in FIG. 8 is merely an example, and should not limit the functions and scope of use of embodiments of the present disclosure.

As shown in FIG. 8, the electronic device 800 may include a processing apparatus (e.g., a central processing apparatus, or a graphics processor) 801, which may execute various appropriate actions and processes in accordance with a program stored in a read only memory (ROM) 802 or a program loaded into a random access memory (RAM) 803 from a storage apparatus 808. The RAM 803 further stores various programs and data required by operations of the electronic device 800. The processing apparatus 801, the ROM 802, and the RAM 803 are connected to each other through a bus 804. An input/output (I/O) interface 805 is also connected to the bus 804.

Generally, the following apparatuses may be connected to the I/O interface 805: an input apparatus 806 including a touch screen, a touch pad, a keyboard, a mouse, a camera, a microphone, an accelerometer, a gyroscope, or the like; an output apparatus 807 including a liquid crystal displayer (LCD), a speaker, a vibrator, or the like; a storage apparatus 808 including a tape, a hard disk, or the like; and a communication apparatus 809. The communication apparatus 809 may allow the electronic device 800 to exchange data with other devices through wireless or wired communication. While FIG. 8 shows the electronic device 800 having various apparatuses, it should be understood that it is not necessary to implement or provide all of the apparatuses shown in the figure. More or fewer apparatuses may be alternatively implemented or provided. Each block shown in FIG. 8 may represent an apparatus, or represent a plurality of apparatuses as required.

In particular, according to embodiments of the present disclosure, the process described above with reference to the flow chart may be implemented in a computer software program. For example, an embodiment of the present disclosure includes a computer program product, which includes a computer program that is tangibly embedded in a computer-readable medium. The computer program includes program codes for performing the method as illustrated in the flow chart. In such an embodiment, the computer program may be downloaded and installed from a network via the communication apparatus 809, or may be installed from the storage apparatus 808, or may be installed from the ROM 802. The computer program, when executed by the processing apparatus 801, implements the above functions defined by the methods of some embodiments of the present disclosure.

It should be noted that the computer readable medium according to some embodiments of the present disclosure may be a computer readable signal medium or a computer readable medium or any combination of the above two. An example of the computer readable medium may include, but is not limited to: electric, magnetic, optical, electromagnetic, infrared, or semiconductor systems, apparatuses, elements, or a combination of any of the above. A more specific example of the computer readable medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In some embodiments of the present disclosure, the computer readable medium may be any tangible medium containing or storing programs, which may be used by, or used in combination with, a command execution system, apparatus or element. In some embodiments of the present disclosure, the computer readable signal medium may include a data signal in the base band or propagating as apart of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

The computer readable medium may be included in the electronic device, or a stand-alone computer readable medium without being assembled into the electronic device. The computer readable medium stores one or more programs. The one or more programs, when executed by the electronic device, cause the electronic device to: acquiring a to-be-played speech; sliding a preset time window at a preset step length in the to-be-played speech to obtain at least one speech segment; generating, based on the at least one speech segment, a mouth shape control parameter sequence for the to-be-played speech; and controlling, in response to playing the to-be-played speech, a preset mouth shape of the three-dimensional virtual portrait to change based on the mouth shape control parameter sequence.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In a circumstance involving a remote computer, the remote computer may be connected to a user's computer through any network, including local area network (LAN) or wide area network (WAN), or be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in some embodiments of the present disclosure may be implemented by software or hardware, e.g., by one or more processors that execute software instructions stored on a non-transitory computer readable medium (memory). The described units may also be provided in a processor, for example, described as: a processor including an acquiring unit, a sliding unit, a generating unit, and a control unit. The names of the units do not constitute a limitation to such units themselves in some cases. For example, the acquiring unit may be further described as "a unit configured to acquire a to-be-played speech."

The above description only provides an explanation of embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for controlling mouth shape changes of a three-dimensional virtual portrait, comprising:
   acquiring a to-be-played speech;
   sliding a preset time window at a preset step length in the to-be-played speech to obtain at least one speech segment;
   generating, based on the at least one speech segment, a mouth shape control parameter sequence for the to-be-played speech; and
   controlling, in response to playing the to-be-played speech, a preset mouth shape of the three-dimensional virtual portrait to change based on the mouth shape control parameter sequence, wherein the generating, based on the at least one speech segment, the mouth shape control parameter sequence for the to-be-played speech comprises:
   generating, for a speech segment of the at least one speech segment, a phoneme information sequence of the speech segment;
   inputting the phoneme information sequence composed of a plurality of pieces of phoneme information into a pre-established mouth shape key point predicting model to obtain a mouth shape key point information sequence composed of a plurality of pieces of mouth shape key point information, wherein the pre-established mouth shape key point predicting model is used to characterize a corresponding relationship between the phoneme information sequence and the mouth shape key point information sequence, wherein the mouth shape key point information indicates position information of a preset number of face key points related to a mouth shape, wherein inputting the phoneme information sequence composed of the plurality of pieces of phoneme information into the pre-established mouth shape key point predicting model to obtain the mouth shape key point information sequence composed of the plurality of pieces of mouth shape key point information comprises: outputting, by the pre-established mouth shape key point predicting model, a first piece of mouth shape key point information by using a first piece of phoneme information as a first input, and outputting, by the pre-established mouth shape key point predicting model, a second piece of mouth shape key point information by using a second piece of phoneme information and the first piece of mouth shape key point information as a second input; and
   generating, based on the mouth shape key point information sequence, the mouth shape control parameter sequence.

2. The method according to claim 1, wherein the generating, based on the at least one speech segment, the mouth shape control parameter sequence for the to-be-played speech comprises:
   generating, based on the at least one speech segment, a two-dimensional feature matrix sequence, and
   inputting the two-dimensional feature matrix sequence into a pre-established convolutional neural network to obtain the mouth shape control parameter sequence, wherein the pre-established convolutional neural network is used to characterize corresponding relationships between two-dimensional feature matrices and mouth shape control parameters,
   wherein the generating, based on the at least one speech segment, the two-dimensional feature matrix sequence comprises:
   generating, for the speech segment of the at least one speech segment, at least one two-dimensional feature matrix for the speech segment; and
   splicing, based on an order of the at least one speech segment in the to-be-played speech, the generated at least one two-dimensional feature matrix into the two-dimensional feature matrix sequence.

3. The method according to claim 2, wherein the generating, for the speech segment of the at least one speech segment, the at least one two-dimensional feature matrix for the speech segment comprises:
   dividing the speech segment into a preset number of speech sub-segments, wherein two adjacent speech sub-segments partially overlap;

extracting, for a speech sub-segment in the preset number of speech sub-segments, a feature of the speech sub-segment to obtain a speech feature vector for the speech sub-segment; and generating, based on obtained preset number of speech feature vectors, the at least one two-dimensional feature matrix for the speech segment.

4. The method according to claim 1, wherein the generating, based on the mouth shape key point information sequence, the mouth shape control parameter sequence comprises:

obtaining, for mouth shape key point information in the mouth shape key point information sequence, at least one mouth shape control parameter corresponding to the mouth shape key point information based on a pre-established corresponding relationship between sample mouth shape key point information and a sample mouth shape control parameter; and generating the mouth shape control parameter sequence based on the obtained at least one mouth shape control parameter.

5. The method according to claim 1, wherein the pre-established mouth shape key point predicting model is a recurrent neural network, and a loop body of the recurrent neural network is a long short-term memory.

6. The method according to claim 1, wherein the pre-established mouth shape key point predicting model is a table storing a plurality of corresponding relationship between phoneme information sequences and mouth shape key point information sequences, wherein the table is determined based on statistics of a large number of the phoneme information sequences and the mouth shape key point information sequences.

7. The method according to claim 1, wherein the pre-established mouth shape key point predicting model comprises a first sub-model and a second sub-model, wherein outputting, by the pre-established mouth shape key point predicting model, the first piece of mouth shape key point information by using the first piece of phoneme information as the first input, and outputting, by the pre-established mouth shape key point predicting model, the second piece of mouth shape key point information by using the second piece of phoneme information and the first piece of mouth shape key point information as the second input comprises:

outputting, by the first sub-model, the first piece of mouth shape key point information by inputting the first piece of phoneme information into the first sub-model; and outputting, by the second sub-model, the second piece of mouth shape key point information by inputting the second piece of phoneme information and the first piece of mouth shape key point information into the second sub-model.

8. The method according to claim 1, wherein the first piece of phoneme information is generated from a first speech segment of the speech segment, and the second piece of phoneme information is generated from a second speech segment of the speech segment, wherein the first speech segment is acquired before a second speed segment is acquired, and a part of the first speech segment is identical to a part of the second speech segment.

9. An apparatus for controlling mouth shape changes of a three-dimensional virtual portrait, comprising:

at least one processor; and a memory storing instructions, the instructions when executed by the at least one processor, cause the at least one processor to perform operations, the operations comprising:

acquiring a to-be-played speech;

sliding a preset time window at a preset step length in the to-be-played speech to obtain at least one speech segment;

generating, based on the at least one speech segment, a mouth shape control parameter sequence for the to-be-played speech; and controlling, in response to playing the to-be-played speech, a preset mouth shape of the three-dimensional virtual portrait to change based on the mouth shape control parameter sequence, wherein the generating, based on the at least one speech segment, the mouth shape control parameter sequence for the to-be-played speech comprises:

generating, for a speech segment of the at least one speech segment, a phoneme information sequence of the speech segment;

inputting the phoneme information sequence composed of a plurality of pieces of phoneme information into a pre-established mouth shape key point predicting model to obtain a mouth shape key point information sequence composed of a plurality of pieces of mouth shape key point information, wherein the pre-established mouth shape key point predicting model is used to characterize a corresponding relationship between the phoneme information sequence and the mouth shape key point information sequence, wherein the mouth shape key point information indicates position information of a preset number of face key points related to a mouth shape, wherein inputting the phoneme information sequence composed of the plurality of pieces of phoneme information into the pre-established mouth shape key point predicting model to obtain the mouth shape key point information sequence composed of the plurality of pieces of mouth shape key point information comprises: outputting, by the pre-established mouth shape key point predicting model, a first piece of mouth shape key point information by using a first piece of phoneme information as a first input, and outputting, by the pre-established mouth shape key point predicting model, a second piece of mouth shape key point information by using a second piece of phoneme information and the first piece of mouth shape key point information as a second input; and generating, based on the mouth shape key point information sequence, the mouth shape control parameter sequence.

10. The apparatus according to claim 9, wherein the generating, based on the at least one speech segment, the mouth shape control parameter sequence for the to-be-played speech comprises:

generating, based on the at least one speech segment, a two-dimensional feature matrix sequence, and inputting the two-dimensional feature matrix sequence into a pre-established convolutional neural network to obtain the mouth shape control parameter sequence, wherein the pre-established convolutional neural network is used to characterize corresponding relationships between two-dimensional feature matrices and mouth shape control parameters, wherein the generating, based on the at least one speech segment, the two-dimensional feature matrix sequence comprises:

generating, for the speech segment of the at least one speech segment, at least one two-dimensional feature matrix for the speech segment; and splicing, based on an order of the at least one speech segment in the to-be-played speech, the generated at least one two-dimensional feature matrix into the two-dimensional feature matrix sequence.

11. The apparatus according to claim 10, wherein the generating, for the speech segment of the at least one speech segment, the at least one two-dimensional feature matrix for the speech segment comprises:
dividing the speech segment into a preset number of speech sub-segments, wherein two adjacent speech sub-segments partially overlap;
extracting, for a speech sub-segment in the preset number of speech sub-segments, a feature of the speech sub-segment to obtain a speech feature vector for the speech sub-segment; and
generating, based on obtained preset number of speech feature vectors, the at least one two-dimensional feature matrix for the speech segment.

12. The apparatus according to claim 9, wherein the generating, based on the mouth shape key point information sequence, the mouth shape control parameter sequence comprises:
obtaining, for mouth shape key point information in the mouth shape key point information sequence, at least one mouth shape control parameter corresponding to the mouth shape key point information based on a pre-established corresponding relationship between sample mouth shape key point information and a sample mouth shape control parameter; and
generating the mouth shape control parameter sequence based on the obtained at least one mouth shape control parameter.

13. The apparatus according to claim 9, wherein the pre-established mouth shape key point predicting model is a recurrent neural network, and a loop body of the recurrent neural network is a long short-term memory.

14. A non-transitory computer readable medium, storing a computer program thereon, wherein the computer program, when executed by a processor, causes the processor to perform operations, the operations comprising:
acquiring a to-be-played speech;
sliding a preset time window at a preset step length in the to-be-played speech to obtain at least one speech segment;
generating, based on the at least one speech segment, a mouth shape control parameter sequence for the to-be-played speech; and
controlling, in response to playing the to-be-played speech, a preset mouth shape of a three-dimensional virtual portrait to change based on the mouth shape control parameter sequence, wherein the generating, based on the at least one speech segment, the mouth shape control parameter sequence for the to-be-played speech comprises:
generating, for a speech segment of the at least one speech segment, a phoneme information sequence of the speech segment;
inputting the phoneme information sequence composed of a plurality of pieces of phoneme information into a pre-established mouth shape key point predicting model to obtain a mouth shape key point information sequence composed of a plurality of pieces of mouth shape key point information, wherein the pre-established mouth shape key point predicting model is used to characterize a corresponding relationship between the phoneme information sequence and the mouth shape key point information sequence, wherein the mouth shape key point information indicates position information of a preset number of face key points related to a mouth shape, wherein inputting the phoneme information sequence composed of the plurality of pieces of phoneme information into the pre-established mouth shape key point predicting model to obtain the mouth shape key point information sequence composed of the plurality of pieces of mouth shape key point information comprises: outputting, by the pre-established mouth shape key point predicting model, a first piece of mouth shape key point information by using a first piece of phoneme information as a first input, and outputting, by the pre-established mouth shape key point predicting model, a second piece of mouth shape key point information by using a second piece of phoneme information and the first piece of mouth shape key point information as a second input; and
generating, based on the mouth shape key point information sequence, the mouth shape control parameter sequence.

* * * * *